(12) United States Patent
Mitsui et al.

(10) Patent No.: US 9,410,226 B2
(45) Date of Patent: Aug. 9, 2016

(54) ORE SLURRY PRODUCTION METHOD AND METAL REFINING METHOD

(71) Applicant: SUMITOMO METAL MINING CO., LTD., Tokyo (JP)

(72) Inventors: Hiroyuki Mitsui, Tokyo (JP); Keisuke Shibayama, Tokyo (JP); Hirofumi Shoji, Tokyo (JP); Tatsuya Higaki, Tokyo (JP); Yoji Kyoda, Tokyo (JP); Osamu Nakai, Tokyo (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 422 days.

(21) Appl. No.: 14/237,593

(22) PCT Filed: Nov. 1, 2012

(86) PCT No.: PCT/JP2012/078289
§ 371 (c)(1),
(2) Date: Feb. 7, 2014

(87) PCT Pub. No.: WO2013/065773
PCT Pub. Date: May 10, 2013

(65) Prior Publication Data
US 2014/0151472 A1    Jun. 5, 2014

(30) Foreign Application Priority Data
Nov. 4, 2011    (JP) .................... 2011-242308

(51) Int. Cl.
*B02C 19/00* (2006.01)
*C22B 3/00* (2006.01)
*C22B 1/00* (2006.01)
*C22B 23/00* (2006.01)

(52) U.S. Cl.
CPC ............. *C22B 23/0407* (2013.01); *B02C 19/00* (2013.01); *C22B 1/00* (2013.01); *C22B 23/005* (2013.01)

(58) Field of Classification Search
CPC .... C22B 23/0407; C22B 1/00; C22B 23/005; B02C 19/00; B02C 19/0056
USPC ................................................ 241/21, 97, 80
See application file for complete search history.

(56) References Cited

U.S. PATENT DOCUMENTS 3,727,849 A    4/1973 Kjos et al.
4,360,500 A *  11/1982 Fly ..................... B01D 11/0219
                                                                 209/158

(Continued)

FOREIGN PATENT DOCUMENTS

AU    2008255186 A1    8/2009
JP    A 11-117030       4/1999

(Continued)

OTHER PUBLICATIONS

Jun. 17, 2015 Search Report issued in European Patent Application No. 12845775.1.

(Continued)

*Primary Examiner* — Mark Rosenbaum
(74) *Attorney, Agent, or Firm* — Oliff PLC

(57) ABSTRACT

Disclosed is a method for producing an ore slurry that can suppress a rise in the viscosity of the ore slurry and consequently prevent a failure in transporting the slurry, and also to provide a metal refining method utilizing such a slurry producing method. The present invention includes: a pulverizing/classifying step of pulverizing raw material ores and classifying the resulting ores at a predetermined classifying point so that oversized ore particles are removed so as to obtain a coarse ore slurry composed of undersized ore particles; a grain size measuring step of measuring the grain size of the resulting coarse ore slurry; and an ore slurry condensing step of loading the coarse ore slurry to a solid-liquid separation device and separating and removing moisture contained in the coarse ore slurry therefrom so as to condense ore components.

11 Claims, 3 Drawing Sheets

(56) References Cited

U.S. PATENT DOCUMENTS

| | | | |
|---|---|---|---|
| 6,053,327 A | 4/2000 | Cardini et al. | |
| 2007/0257139 A1* | 11/2007 | Hindstrom | B02C 19/186 241/24.13 |

FOREIGN PATENT DOCUMENTS

| JP | A 11-124640 | 5/1999 |
|---|---|---|
| JP | A 2005-350766 | 12/2005 |
| JP | A 2008-189999 | 8/2008 |
| JP | A 2009-173967 | 8/2009 |
| JP | A 2009-270300 | 11/2009 |
| JP | A 2010-95788 | 4/2010 |

OTHER PUBLICATIONS

Jan. 29, 2013 Search Report issued in International Patent Application No. PCT/JP2012/078289 (with translation).

* cited by examiner

ORE SLURRY PRODUCTION METHOD AND METAL REFINING METHOD

FIELD OF THE INVENTION

This invention relates to a method of producing an ore slurry and a metal refining method, and more particularly concerns a method of producing an ore slurry that can suppress a rise in the viscosity of the ore slurry and a metal refining method to which such a method of producing an ore slurry is applied.

The present application asserts priority rights based on JP Patent Application 2011-242308 filed in Japan on Nov. 4, 2011. The total contents of disclosure of the Patent Application of the senior filing date are to be incorporated by reference into the present Application.

BACKGROUND OF THE INVENTION

In recent years, as a refining method for recovering nickel and cobalt from nickel oxide ores containing nickel and cobalt respectively about 1.0 to 2.0% and about 0.1 to 0.5% relative to the total amounts thereof, a high-temperature pressure acid leaching method (hereinafter, referred to sometimes as HPAL Method: high pressure acid leach), which is one of wet refining methods, has been utilized.

The HPAL method is a leaching treatment method in which, for example, sulfuric acid is added to an ore slurry of nickel oxide ores, and a leaching process is carried out under high-temperature and high-pressure so that a leached liquor containing nickel and cobalt is obtained. In this case, a refining method is carried out in which the leaching step utilizing the HPAL method, a neutralizing step of adjusting the pH of the resulting leached liquor and of forming a neutralized deposit slurry containing impurities such as iron or the like and a mother liquor for use in nickel recovery, which is purified, and a sulfidizing step of supplying a hydrogen sulfide gas to the nickel recovery-use mother liquor so as to form a nickel-cobalt mixed sulfide and a barren liquor are carried out (for example, see Patent Document 1).

In this refining method, in the leaching step, in general, nickel and cobalt of 90% or more contained in the ore slurry are leached out. Then, after the separation of the leached liquor, impurities in the leached liquor are separated and removed therefrom by a neutralizing method so that a nickel-cobalt mixed sulfide having a nickel quality of 55 to 60% and a cobalt quality of about 3 to 6% can be obtained, and this is used as an intermediate material for use in the nickel-cobalt refining process.

In this case, raw material ores, such as nickel oxide ores, to be used in the above-mentioned refining process or the like are normally subjected to an ore treatment and processed into an ore slurry so as to be loaded into a refining process, and they are used in a leaching treatment, etc., in the form of the ore slurry.

More specifically, the ore treatment for the raw material ores is mainly classified into a pulverizing/classifying step in which the raw material ores are subjected to a pulverizing process and a classifying (sieving) process including multiple stages and an ore slurry condensing step in which ore components are condensed.

First, in the pulverizing/classifying step, a pulverizing process for the raw material ores by the use of a wet facility and a classifying process for removing oversized ore particles and mixed matters are carried out so that a coarse ore slurry composed of undersized ore particles is produced (for example, see Patent Document 2).

In this case, since the produced coarse ore slurry contains excessive moisture, the excessively contained moisture is removed in the next ore slurry condensing step (for example, see Patent Document 3). Since the ore components contained in the ore slurry per the same transporting amount are increased, this moisture removal is effective for improving the operation efficiency of the plants as a whole.

However, the above-mentioned conventional ore treatment tends to form fine ore particles due to fluctuations of the grain size of the raw material ores to be loaded and degrees of pulverization in the pulverizing process, with the result that the viscosity of the resulting ore slurry tends to become too high.

More specifically, upon adjusting the ores to a predetermined grain size by the pulverizing process and the classifying (sieving) process including multiple steps, fine ore particles are formed, with the result that the grain size of the undersized ore particles that have been classified and recovered tends to be shifted to a small size. In this case, even after the pulverizing/classifying step, since no process for removing fine ore particles is prepared, an ore slurry having a small grain size tends to be obtained. It has been known that when such an ore slurry is used, the viscosity of the ore slurry becomes too high.

Additionally, in the case when the viscosity of an ore slurry is represented at the actual operation site, a value (unit: Pa) of a yield stress is generally used as an alternative index. The reason for this is because the yield stress is more easily measured, and because as the viscosity of the ore slurry becomes higher, the value of the yield stress also becomes greater, while, in contrast, as the viscosity becomes lower, the value of the yield stress also becomes smaller, so that an erroneous recognition hardly occurs. Therefore, in the following description, the yield stress of the ore slurry is sometimes used for indicating the viscosity of the ore slurry.

On the other hand, the capability of a transporting pump for use in transporting the ore slurry to a metal refining process, such as a leaching step or the like, is generally set to 200 Pa or less in the yield stress of the ore slurry; thus, a reasonable facility price is obtained, with a comparatively simple structure.

Therefore, in the case when the yield stress of the ore slurry becomes high as described above, and exceeds, for example, 200 Pa, a problem is raised in that the transporting process cannot be carried out by using a general-use slurry transporting pump. Such a problem causes a situation in which the plant has to be temporarily stopped, resulting in a serious reduction in operation efficiency.

In order to prevent such a viscosity rise in the ore slurry, a method is proposed in which "a shearing pump" that utilizes an effect for reducing the viscosity in the slurry (Shear Thinning effect), by applying a shearing force thereto several times prior to transporting the slurry; however, this method undesirably requires expensive facilities, and causes a complicated facility structure, and high costs for introducing the method as well as high maintenance costs.

Moreover, in the case when such an ore slurry with high viscosity is transported to the leaching process using, for example, the HPAL method, although the ore slurry can be transported by using the above-mentioned shearing pump, upon providing a high-temperature state by heat exchange with high-temperature water vapor by using a heat exchanger in the initial stage of the leaching process, the heat exchanging efficiency is lowered. This is because when the yield stress of the ore slurry becomes such a high degree as to exceed, for example, 200 Pa, in the initial stage after being loaded into a heat exchanger, the ore slurry tends to adhere to its wall surfaces and members, and anchored thereon without being allowed to flow, resulting in clogging of the device in the worst case.

On the other hand, for example, in order to avoid the grain size of the ores to be loaded from becoming too small, a method is easily proposed in which a process for removing fine ore particles is newly installed as the final stage of the pulverizing/ classifying step; however, high costs are required for introducing such a facility. Moreover, the amount of ores to be rejected from the pulverizing/classifying step increases to cause a problem in that resources are not effectively utilized.

Moreover, as the viscosity adjusting method, for example, as described in Patent Document 4, a method or the like is proposed in which in order to allow muddy water whose viscosity is unknown to exert a predetermined viscosity, the added water amount is adjusted; however, this technique relates to an adjusting method for the viscosity of muddy water for use in a shield engineering technique, a pile engineering technique, a fluidization treatment engineering technique, an underground continuous wall engineering technique and the like in the construction field, and it is difficult to apply this method to the viscosity adjusting method for an ore slurry after having been dehydrated.

PRIOR-ART DOCUMENTS

Patent Document

PTL 1: Japanese Patent Application Laid-Open No. 2005-350766
PTL 2: Japanese Patent Application Laid-Open No. 2009-173967
PTL 3: Japanese Patent Application Laid-Open No. 11-124640
PTL 4: Japanese Patent Application Laid-Open No. 2009-270300

SUMMARY OF THE INVENTION

In view of these circumstances, the present invention has been devised, and its object is to provide a method for producing an ore slurry that makes it possible to suppress a rise in the viscosity of the ore slurry, and consequently to prevent a failure in transportation and a metal refining method utilizing such a method.

In order to achieve the above object, the present inventors have intensively studied and have found that in an ore slurry producing method for producing the ore slurry from raw material ores, by loading and adding one portion of oversized particles that have been removed in the pulverizing/classifying step to an ore slurry condensing step, a rise in the viscosity of the ore slurry can be suppressed, and thus the present invention has been completed.

That is, a method for producing an ore slurry in accordance with the present invention, which is an ore slurry producing method for producing an ore slurry from raw material ores, is provided with: a pulverizing/classifying step of pulverizing the raw material ores and classifying the resulting ores at a predetermined classifying point so that oversized ore particles are removed so as to obtain a coarse ore slurry composed of undersized ore particles; a grain size measuring step of measuring the grain size of the coarse ore slurry obtained by the pulverizing/classifying step; and an ore slurry condensing step of loading the coarse ore slurry to a solid-liquid separation device and separating and removing moisture contained in the coarse ore slurry therefrom so as to condense ore components, and this method is characterized in that in the case when the grain size measured in the grain size measuring step is lower than a predetermined value, one portion of the oversized ore particles that have been removed in the pulverizing/classifying step is loaded and added to the solid-liquid separation device in the ore slurry condensing step.

The above-mentioned predetermined value for the grain size is set to such a value corresponding to a grain size that causes a failure in transportation of the ore slurry due to a rise in viscosity of the ore slurry thus produced, and the grain size is preferably set so as to cause a yield stress of the ore slurry to exceed 200 Pa. More specifically, the predetermined value for the grain size is preferably 20 μm.

Moreover, upon loading and adding the oversized ore particles to the solid-liquid separation device in the ore slurry condensing step, the oversized ore particles are adjusted so as to have a particle size in a range from 20 to 100 μm and added thereto.

Furthermore, the oversized ore particles are preferably added at a rate of 1 to 30 weight % relative to the entire ore particles to be loaded into the solid-liquid separation device.

As the raw material ores, nickel oxide ores may be used. Moreover, the ore slurry is used for a process for recovering nickel and cobalt from the ore slurry by a high-temperature pressure leaching method by the use of sulfuric acid.

A metal refining method in accordance with the present invention, which is the metal refining method for recovering a metal contained in raw material ores from the raw material ores, is provided with: an ore slurry production process including a pulverizing/classifying step of pulverizing the raw material ores and classifying the resulting ores at a predetermined classifying point so that oversized ore particles are removed so as to obtain a coarse ore slurry composed of undersized ore particles; a grain size measuring step of measuring the grain size of the coarse ore slurry obtained by the pulverizing/classifying step; and an ore slurry condensing step of loading the coarse ore slurry to a solid-liquid separation device and separating and removing moisture contained in the coarse ore slurry therefrom so as to condense ore components, and this method is characterized in that in the case when the grain size measured in the grain size measuring step is lower than a predetermined value, one portion of the oversized ore particles that have been removed in the pulverizing/classifying step is loaded and added to the solid-liquid separation device in the ore slurry condensing step.

As the raw material ores, nickel oxide ores may be used, and the method is applied to a recovering method for nickel and cobalt from the nickel oxide ores. Moreover, the ore slurry produced by the ore slurry producing steps may be applied to a method in which the ore slurry is added to sulfuric acid and leached out under high temperature and high pressure so that a leached liquor containing nickel and cobalt is obtained.

EFFECTS OF THE INVENTION

The present invention produces an ore slurry that makes it possible to suppress a rise in the viscosity of the ore slurry, and consequently to prevent a failure in transporting the ore slurry to the next process. In accordance with this ore slurry, it is possible to transport the ore slurry efficiently to a metal refining process or the like, without the necessity of preparing a new facility or the like, and consequently to carry out the operation efficiently.

DETAILED DESCRIPTION OF THE INVENTION

Referring to Figures, the following description will discuss specific embodiments (hereinafter, referred to as present embodiments) of the present invention in the following order in detail. Additionally, the present invention is not intended to be limited by the following embodiments, and various modifications may be made thereto without departing from the gist of the present invention.
1. Production Method of Ore Slurry
    1-1. Outline
    1-2. Concerning Respective Processes
    1-3. Concerning Production Flow
2. Metal Refining Method (Wet Refining Method of Nickel Oxide Ore)
3. Examples <1. Production Method of Ore Slurry>
<1-1. Outline>

A production method of an ore slurry in accordance with the present embodiment relates to a method of producing an ore slurry to be used upon carrying out a metal refining process, or the like, for use in recovering a metal, such as, for example, nickel, cobalt, or the like from raw material ores.

Figure 1:
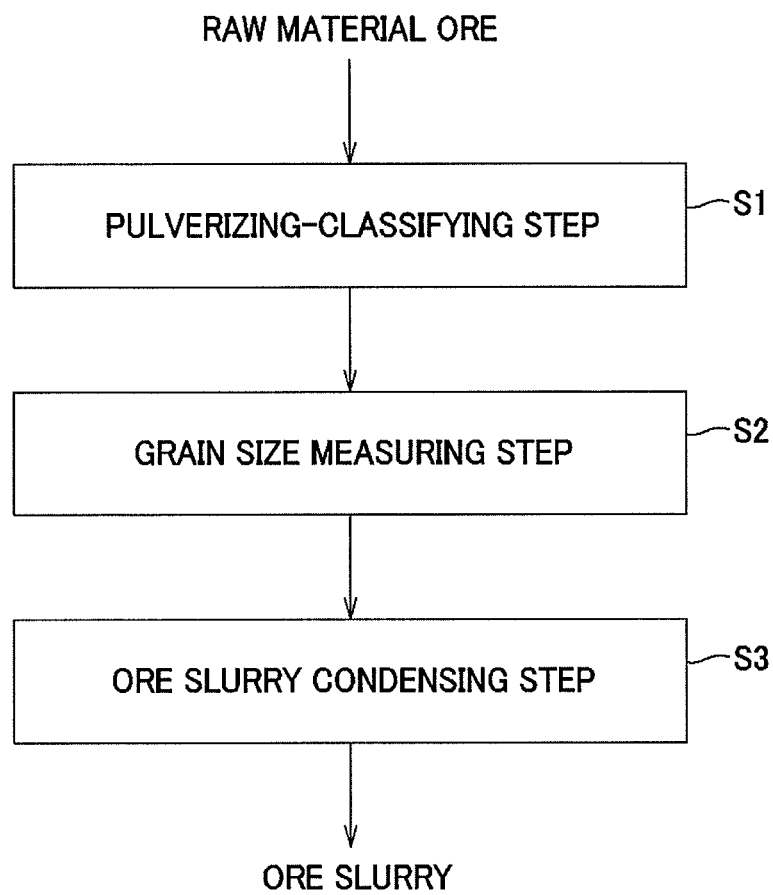
FIG. 1 is a process drawing that shows a production method of an ore slurry.

More specifically, as shown in FIG. 1, the production method of an ore slurry in accordance with the present embodiment is provided with: a pulverizing/classifying step S1 in which material ores are pulverized and classified at a predetermined classifying point to remove oversized ore particles so that a coarse ore slurry composed of undersized ore particles is obtained; a grain size measuring step S2 in which the grain size of the coarse ore slurry obtained in the pulverizing/classifying step S1 is measured; and an ore slurry condensing step S3 in which the coarse ore slurry is loaded into a solid-liquid separation device, and by separating and removing moisture contained in the coarse ore slurry therefrom, ore components are condensed.

Then, the production method of the ore slurry in accordance with the present embodiment is characterized in that in the case when the grain size of the coarse ore slurry measured in the grain size measuring step S2 is a predetermined value or less, to the coarse ore slurry measured in the grain size measuring step S2, one portion of the oversized ore particles that have been removed in the pulverizing/classifying step S1 is loaded and added to the solid-liquid separation device in the ore slurry condensing step S3.

In this case, in a conventional ore slurry production process, after the raw material ores have been pulverized and oversized ore particles have been removed by classifying them at a predetermined classifying point, only the undersized ore slurry, as it is, is loaded and added to a solid-liquid separation device, such as a thickener or the like, so that an ore slurry is obtained. However, in this conventional method, fine ore particles are formed due to grain size fluctuations of the raw material ores, the degree of pulverizing process and the like, the grain size of the undersize ore particles obtained by the classifying process tends to fluctuate in such a direction as to be made excessively small.

An ore slurry obtained by such fine ore particles tends to have a rise in its slurry viscosity. This is presumably because in the ore slurry composed of ore particles having a small grain size, fine ore particles are mutually aggregated by a predetermined aggregating force, with the result that moisture is taken among the aggregated particles to reduce an apparent amount of a solvent in the slurry, resulting in a rise in the viscosity of the ore slurry.

In the case when the slurry viscosity of the ore slurry rises in this manner, upon transporting the ore slurry, for example, to a metal refining treatment step process, it is not possible to transport the ore slurry effectively by using a normal transporting pump, resulting in a failure such as adhesion of the slurry to pipes. When such a transporting failure of the ore slurry occurs in the metal refining treatment, the operation needs to be temporarily stopped so as to remove the slurry adhered to the pipes, resulting in a serious reduction in the operation efficiency.

Therefore, in the method of producing an ore slurry in accordance with the present embodiment, the grain size of a coarse ore slurry composed of the undersize ore particles classified in the pulverizing/classifying step S1 is measured, and in the case when the grain size is lower than a predetermined value, one portion of the removed oversized ore particles is loaded and added to the solid-liquid separation device together with the undersized ore particles so that the ores are condensed. With this arrangement, even in the case when fine ore particles are generated due to the pulverizing process, the grain size fluctuations of the raw material ores, or the like, since one portion of the fine particles is, for example, replaced by comparatively large particles, it is possible to suppress a rise in the viscosity of the ore slurry.

That is, by adding one portion of the oversized ore particles to the coarse ore slurry composed of undersized ore particles, the physical aggregation between the fine ore particles is intervened. With this process, it is possible to suppress moisture from being held among the particles, and to consequently reduce the slurry viscosity after the condensation.

Moreover, by suppressing the rise in viscosity of the ore slurry in this manner, it is possible to effectively prevent the transporting failure of the ore slurry, and consequently to provide a process that is effectively used for a treatment relating to, for example, a metal refining process, or the like, without the necessity of preparing a new facility or the like.

The following description will discuss respective steps and a production flow of the method for producing ore slurry in accordance with the present embodiment, more specifically.

<1-2. Concerning Respective Steps>
(Pulverizing/Classifying Steps)

First, in the pulverizing/classifying step S1, raw material ores are pulverized, and the pulverized ores are classified at a predetermined classifying point so that oversized ore particles are removed to obtain a coarse ore slurry composed of undersized ore particles. In this pulverizing/classifying step S1, for example, pebbles, tree roots and the like are removed from the raw material ores, and the raw material ores aggregated into lumps are also pulverized and classified at the predetermined classifying point.

As the raw material ores, any ores may be used as long as they are ores containing metal. More specifically, for example, nickel oxide ores containing nickel and cobalt, copper oxide ores containing copper, and the like are proposed.

For example, the nickel oxide ores mainly include so-called laterite ores, such as limonite ore and saprolite ore. The laterite ores normally have a nickel content in a range from 0.8 to 2.5 weight %, and nickel components are contained as hydroxides or noumeite (magnesium silicate) ores. Moreover, the iron content thereof is normally in a range from 10 to 50 weight %, and iron components are mainly contained as trivalent hydroxides (goethite); however, one portion of divalent iron is contained in the noumeite ores. Furthermore, in addition to the laterite ores, oxide ores containing polyvalent metals, such as nickel, cobalt, manganese, copper or the like, for example, manganese stocks deposited on the deep sea bed, may be utilized.

As the pulverizing method for material ores, not particularly limited, a general-use pulverizer, such as a ball mill, a rod mill, an AG mill or the like, may be used for the pulverizing process. Moreover, with respect to the size of the pulverizer, the size of media to be pulverized, and the like, not particularly limited, by carrying out preliminary tests, for example, on distributions of the grain size, hardness and the like of materials ores to be pulverized, selection is appropriately made based upon the results.

With respect to a classifying method for the pulverized material ores, not particularly limited, as long as it can classify ores based upon a desired grain size, a sieve classifying process by using, for example, a general-use grizzly, an oscillation sieve or the like, may be carried out.

Moreover, with respect to the classifying point for use in classifying material ores, not particularly limited, a classifying point for use in producing an ore slurry composed of ore particles having a desired particle diameter value or less can be appropriately set.

More specifically, for example, by setting the classifying point to about 1.4 mm, the classifying process can be carried out by using a sieve with a mesh having an opening of 1.4 mm. By carrying out the classifying process in this manner, ore particles having a grain size larger than 1.4 mm remaining on the sieve, that is, oversized ore particles, are removed together with pebbles, tree roots and the like. Additionally, the removed oversized ore particles are recovered in a separated manner, and if necessary, these are loaded and added to a solid-liquid separation device for use in an ore slurry condensing step S3 in the following step. This will be described later in detail.

On the other hand, the ore particles under the sieve (under the mesh) that have passed through the mesh of the sieve are small ore particles having a grain size of 1.4 mm or less, that is, undersized ore particles. These undersized ore particles are recovered in the pulverizing/classifying step S1 as a coarse ore slurry and transferred to the next step.

(Grain Size Measuring Step)

Next, in a grain size measuring step S2, the grain size of the coarse ore slurry obtained in the pulverizing/classifying step S1 is measured. That is, the grain size of the undersized ore particles classified based upon a predetermined classifying point in the pulverizing/classifying step S1 is measured.

More specifically, in the grain size measurements of the ore slurry, a predetermined amount of the coarse ore slurry is sampled, and the volume-average grain size (my value) of the sampled coarse ore slurry is measured by using, for example, a microtrack grain size measuring device, or the like.

Moreover, in the grain size measuring step S2, a determination is made as to whether or not the grain size of the coarse ore slurry that has been subjected to the grain size measurements is a predetermined value or less. In this case, as the predetermined value of the grain size, although it defers depending on the material ore to be used, the value is determined as a grain size value at which the viscosity of an ore slurry to be produced is raised to initially cause a failure in transportation when the resulting ore slurry is transported to the next step by using a transporting pump or the like.

As described above, in the processes of the pulverizing/classifying step S1, one portion of ore particles becomes fine due to grain size deviations of the raw material ores and the pulverizing process, with the result that the grain size of the coarse ore slurry composed of the undersized ore particles that have been classified based upon a predetermined classifying point might sometimes be shifted in such a direction as to be made smaller. When the grain size is shifted in such a direction as to be made smaller, the viscosity of the ore slurry gradually rises, resulting in a failure to transport the ore slurry. For this reason, in the grain size measuring step S2, first, the grain size of the coarse ore slurry obtained through the pulverizing/classifying step S1 is measured, and determined as to whether or not the ore slurry resulting from the coarse ore slurry is lower than the grain size that might cause a rise in the viscosity, and the subsequent failure in transportation.

More specifically, as the grain size by which the viscosity of the ore slurry is raised to initially cause a failure in transportation, such a grain size that causes the yield stress of the resultant ore slurry to exceed 200 Pa is preferably used. In a transporting pump generally used in a metal refining process using an ore slurry, when the yield stress of the ore slurry exceeds 200 Pa, a transporting failure occurs, making it impossible to transport the ore slurry. In the event of this transporting failure, the corresponding plant might be temporarily stopped to cause a serious reduction in operation efficiency. Therefore, although a detailed explanation will be given later, by using the grain size that causes the grain size of the coarse ore slurry subjected to the grain size measurement to exceed 200 Pa as an index, and by determining whether the index grain size is exceeded or not, the viscosity rise of the ore slurry is suppressed, thereby making it possible to prevent the occurrence of a transporting failure or the like.

With respect to the grain size conditions of the ore slurry, although slightly different depending on the kinds of material ores to be used, the yield stress of the ore slurry is made to exceed 200 Pa in the case when the particle diameter of the ore slurry is less than 20 μm. For this reason, the predetermined value of the grain size of the ore slurry can be set to 20 μm, and the determination can be made based upon whether or not the value is lower than 20 μm (less than 20 μm).

(Ore Slurry Condensing Step)

In the ore slurry condensing step S3, a coarse ore slurry containing undersized ore particles obtained by the classifying process is loaded into a solid-liquid separation device, and moisture contained in the coarse ore slurry is separated and removed to condense the ore components to obtain an ore slurry.

More specifically, in the ore slurry condensing step S3, the coarse ore slurry is loaded into a solid-liquid separation device, such as, for example, a thickener or the like, and the solid component is precipitated, and taken out from the lower portion of the device, while on the other hand, moisture forming a supernatant is overflowed from the upper portion of the device; thus, a solid-liquid separating process is carried out. By this solid-liquid separating process, the moisture in the coarse ore slurry is reduced, and the ore components in the slurry are condensed so that an ore slurry containing a solid component concentration of about 40 weight % can be obtained.

In the ore slurry condensing step S3, prior to the loading of the coarse ore slurry into the solid-liquid separation device, if necessary, a coagulant may be added thereto. By adding a coagulant thereto in this manner, the aggregation of the solid components in the coarse ore slurry is accelerated so that the precipitation can also be accelerated. As the coagulant to be added, for example, a polymeric coagulant may be used, and various kinds thereof having various molecular weights can be used. Moreover, the coagulant is appropriately diluted and by being mixed with the coarse ore slurry to be sufficiently made in contact therewith so that its effect is exerted. For this reason, in order to be sufficiently made in contact with the coarse ore slurry, the coagulant after having been diluted is preferably added into the flow of the coarse ore slurry, for example, at a feed-well portion of the thickener.

In the method for producing an ore slurry in accordance with the present embodiment, in the case when the grain size of the coarse ore slurry measured in the grain size measuring step S2 is lower than the above-mentioned predetermined value in the ore slurry condensing step S3, one portion of the oversized ore particles removed in the pulverizing/classifying step S1 is loaded and added to the solid-liquid separation device together with the coarse ore slurry.

In the case when the grain size of the coarse ore slurry composed of the undersized ore particles classified in the pulverizing/classifying step S1 is lower than the predetermined value, one portion of the oversized ore particles that have been removed is loaded and added to the solid-liquid separation device in this manner so that it is possible to suppress a rise in the viscosity of the resulting ore slurry.

In other words, even in the case when the ore particles constituting a coarse ore slurry form fine particles by the pulverizing process, with its grain size being shifted in such a direction as to be made smaller, by loading and adding one portion of the oversized ore particles that have been removed, together with the coarse ore slurry, one portion of the ore slurry to be condensed is allowed to form particles with a large particle diameter. For this reason, the grain size of the entire ore particles to be processed becomes greater, thereby making it possible to suppress a rise in viscosity of the ore slurry. Since the viscosity rise is suppressed in this manner, it is possible to effectively prevent a transporting failure of the ore slurry, and consequently to effectively transport the ore slurry to, for example, a metal refining process or the like.

With respect to the size of the oversized ore particles to be loaded and added, although not particularly limited, those having an adjusted particle diameter of 20 to 100 µm are preferably added. In the case when the particle diameter of the ore particles is less than 20 µm, the effect for suppressing the viscosity rise in the ore slurry might not be obtained sufficiently. In contrast, in the case when the particle diameter of the ore particles is greater than 100 µm, although the effect for suppressing the viscosity rise in the ore slurry is sufficiently obtained, deviations in the particle diameter size of the resulting ore slurry tend to become greater, and its specific surface area becomes smaller. Consequently, the reactivity of the ore slurry to be used as a material for a metal refining process or the like, that is, for example, the leach efficiency of a polyvalent metal, or the like, might deteriorate. Therefore, by adding those ore particles having an adjusted particle diameter of about 20 to 100 µm, the viscosity rise of the ore slurry can be more effectively suppressed, and the reduction of the reactivity of the resulting ore slurry is suppressed so that the refining process or the like can be effectively carried out.

Upon adjusting the particle diameter of the oversized ore particles, the particle diameter adjusting method is not particularly limited, and, for example, a general-use pulverizer, such as a ball mill, a rod mill, an AG mill or the like used in the aforementioned pulverizing process, may be used for the adjusting process. Moreover, the grain size measurements of the adjusted ore particles may be carried out by using a microtrack grain size measuring device or the like.

Moreover, although not particularly limited, the added amount of the oversized ore particles is preferably set to a ratio in a range of 1 to 30 weight % relative to the entire ore particles to be loaded into the solid-liquid separation device, that is, the entire ore particles including the ore particles in the coarse ore slurry and the oversized ore particles to be added thereto. In the case when the added amount of the ore particles is less than 1 weight % relative to the entire ore particles, since the existence ratio of the large particles is too low, it might be difficult to sufficiently obtain the effect for suppressing the viscosity rise of the ore slurry. In contrast, in the case when the added amount of the ore particles exceeds 30 weight % relative to the entire ore particles, the reactivity of the ore slurry might deteriorate. Therefore, by adding the oversized ore particles at a ratio of 1 to 30 weight % relative to the entire ore particles, it becomes possible to more effectively suppress the viscosity rise of the ore slurry and also to suppress the reduction of the reactivity of the resulting ore slurry, thereby making it possible to effectively carry out a refining process and the like.

As described above, in the method for producing an ore slurry in accordance with the present embodiment, the grain size of the coarse ore slurry composed of the undersized ore particles classified in the pulverizing/classifying step S1 is measured. Then, in the case when the grain size of the measured coarse ore slurry is lower than a predetermined value, one portion of the oversized ore particles removed in the pulverizing/classifying step S1 is loaded and added to the solid-liquid separation device together with the coarse ore slurry so that an ore slurry is produced.

With this arrangement, even when fine particles are generated in the pulverizing process, the aggregation of mutual fine particles is intervened so that the viscosity of the ore slurry is prevented from rising. Moreover, by preventing the viscosity rise in this manner, it is possible to effectively prevent a transporting failure of the ore slurry so that the ore slurry is effectively used for, for example, a metal refining process or the like, without the necessity of preparing a new facility or the like.

As the method for measuring the viscosity of the ore slurry, although not particularly limited, for example, a rheometer or the like may be used for carrying out the measurements. Moreover, the viscosity of the ore slurry can be calculated as a yield stress obtained from a slump test.

The slump test, which is a well-known method for use in an actual operation site for dealing with the ore slurry, is a method similar to a concrete slump testing method (JIS A 1101). The slump test has measuring processes in which a cylindrical pipe is filled with a slurry, and allowed to stand upright on a horizontal surface, and by gently drawing only the pipe upward, the pillar of the slurry is expanded in its bottom portion to cause the height to become lower by its own weight; thus, the measurements are carried out by utilizing this fact. That is, supposing that the height of the cylindrical pipe is $H_0$ ($\approx$the height of the slurry column immediately after drawing the pipe), that the height of the slurry after having been deformed by its own weight thereafter is $H_1$, and that the rate of change is S, S is represented by the following formula (1), and by substituting the density $\gamma[g/L]$ of the slurry for the following formula (2), a yield stress [Pa] can be obtained.

$$S=(H_0-H_1)/H_0 \tag{1}$$

$$\text{Yield stress [Pa]}=0.5\times(1-S^{0.5})\times\gamma\times0.98\times H_0 \tag{2}$$

<1-3. Concerning Production Flow>

Figure 2:
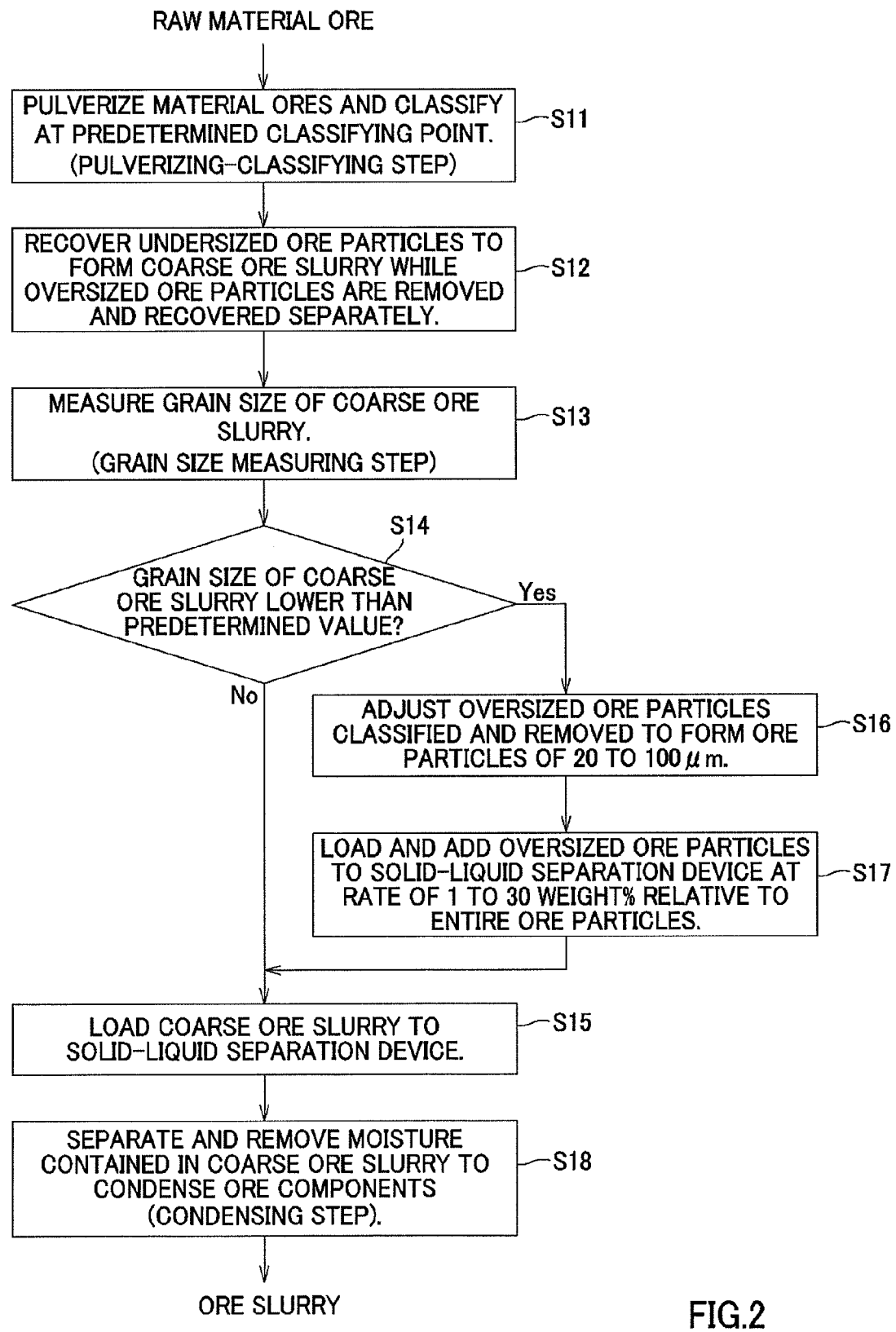
FIG. 2 is a flow chart that shows a production flow of the ore slurry.

Next, referring to a flowchart shown in FIG. 2, the following description will discuss a production flow of an ore slurry in accordance with the present embodiment. Additionally, the particle diameter and the added amount of the ore particles or the device to be used and the like explained by reference to the production flow are exemplary only, and needless to say that the present invention is not intended to be limited by these.

First, in step S11, for example, material ores, such as, for example, nickel oxide ores, are pulverized by using a general-use pulverizer, and classified by using a sieve with a mesh having, for example, an opening of 1.4 mm.

Next, in step S12, undersized ore particles obtained by the classifying process in step S11 are recovered, and formed into a coarse ore slurry. On the other hand, since the oversized ore particles thus classified are ore particles having a small content of metals, such as, for example, nickel, these are removed and recovered in a separated manner.

In step S13, the grain size of a coarse ore slurry composed of the undersized ore particles is measured. The grain size measurements are carried out by using, for example, a microtrack grain size measuring device or the like so that the volume-average diameter (mv) or the like is calculated.

Moreover, in step S14, a determination is made as to whether or not the measured grain size of the coarse ore slurry measured in step S13 is lower than a predetermined value. As the predetermined value, such a grain size value is used at which the viscosity of an ore slurry produced from the coarse ore slurry and subjected to the grain size measurements is raised to initially cause a failure in transportation of the ore slurry, that is, for example, a grain size that causes the ore slurry to have a yield stress exceeding 200 Pa is used. In this case, since the grain size condition by which the yield stress of the ore slurry exceeds 200 Pa is less than 20 μm, determination may be made as to whether or not the grain size of the ore slurry is lower than 20 μm (less than 20 μm).

In step S14, in the case when the grain size of the coarse ore slurry is not lower than the predetermined value (in the case of No), the sequence proceeds to step S15, while in the case when the measured grain size of the coarse ore slurry is lower than the predetermined value (in the case of Yes), the sequence proceeds to step S16.

First, in the case when it is determined in step S14 that the grain size of the coarse ore slurry is not lower than the predetermined value (No), in step S15, the entire amount of the coarse ore slurry is loaded and added into a solid-liquid separation device, such as a thickener or the like, and prepared for a condensing process of the ore components in step S18.

In contrast, in the case when it is determined in step S14 that the grain size of the coarse ore slurry is lower than the predetermined value (Yes), in step S16, the oversized ore particles removed and recovered in step S12 are adjusted and formed into particles having a grain size, for example, in a range from 20 to 100 μm. This grain size adjustment can be carried out by using a general-use pulverizer in the same manner as in the pulverizing process in step S11. Then, in step S16, the grain size of the ore particles obtained by adjusting the grain size on demand is measured, and it is confirmed as to whether or not the grain size is adjusted to a desired value. Next, the sequence proceeds to step S17.

In step S17, the ore particles (oversized ore particles) that have been particle-diameter adjusted in step S16 are loaded and added into the solid-liquid separation device. At this time, the added amount of the oversized ore particles is preferably set to a ratio in a range of 1 to 30 weight % relative to the entire ore particles to be loaded into the solid-liquid separation device, that is, for example, the entire ore particles including the ore particles in the coarse ore slurry added in step S15 and the oversized ore particles to be added in step S17.

Moreover, in step S18, the coarse ore slurry prepared and loaded into the solid-liquid separation device in step S15 or the coarse ore slurry containing one portion of the oversized ore particles is subjected to a condensing process. The condensing process separates and removes moisture contained in the coarse ore slurry therefrom so as to condense the ore components. After the condensing process, an ore slurry is obtained.

As described above, in the production flow of the ore slurry in accordance with the present embodiment, the grain size of the coarse ore slurry composed of the undersized ore particles obtained by pulverizing an classifying material ores is measured, and it is determined whether or not the particle diameter of the ore particles is lower than a predetermined value. Then, in the case when the grain size of the coarse ore slurry is not lower than the predetermined value, the coarse ore slurry, as it is, is loaded into the solid-liquid separation device so that the ore components are condensed to form an ore slurry. In contrast, in the case when the measured grain size of the coarse ore slurry is lower than the predetermined value, one portion of the oversized ore particles removed in the pulverizing/classifying process of the raw material ores is loaded and added to the solid-liquid separation device together with the coarse ore slurry and subjected to the condensing process.

By producing the ore slurry in this manner, it becomes possible to suppress the slurry viscosity from rising due to the fact that the ore slurry is composed of fine ore particles, and also to prevent the occurrence of a transporting failure upon transporting the ore slurry through a transporting pump.

The above-mentioned method of producing an ore slurry is desirably applied, for example, to a producing process for an ore slurry to be used in a metal refining method for recovering polyvalent metals from raw material ores, and in particular, is more effectively applied to a producing process for an ore slurry to be used in a wet metal refining method to which a high-temperature pressure acid leaching method (HPAL method) by the use of sulfuric acid is applied.

The HPAL method, which is utilized as a wet refining method for recovering nickel and cobalt from nickel oxide ores containing nickel and cobalt, includes processes in which sulfuric acid is added to an ore slurry obtained from the nickel oxide ores and this is leached at high temperature and high pressure to obtain a leached liquid containing nickel and cobalt. In this HPAL method, in the initial stage of the leaching process, high temperature conditions are prepared by converting high-temperature water vapor to high temperature by using a heat exchanger.

At this time, in the case when the ore slurry to be used for leaching has a high yield stress, for example, as high as 200 Pa or more, the transported ore slurry is adhered to the wall face and the members of the heat exchanger to be anchored thereon in the initial stage after having been loaded into the heat exchanger, without being allowed to flow, resulting in a clogged device to cause a serious reduction of the heat exchanging efficiency. When such a circumstance occurs, it becomes difficult to increase the temperature to a desired high-temperature condition to cause a reduction in the leaching efficiency of nickel and cobalt.

However, as described above, by using the method of producing an ore slurry in accordance with the present embodiment, it becomes possible to produce an ore slurry in which the rise of the slurry viscosity is suppressed, and when the HPAL method is carried out by using the resulting ore slurry, it becomes possible to prevent a transporting failure to a leaching process and also to prevent a reduction in the heat exchanging efficiency so that a leaching process is effectively carried out efficiently.

<2. Metal Refining Method (Wet Refining Method for Nickel Oxide Ore)>

Next, the following description will discuss a wet refining method for recovering nickel and cobalt from nickel oxide ores by the HPAL method by using an ore slurry produced via the method of producing the above-mentioned ore slurry.

Figure 3:
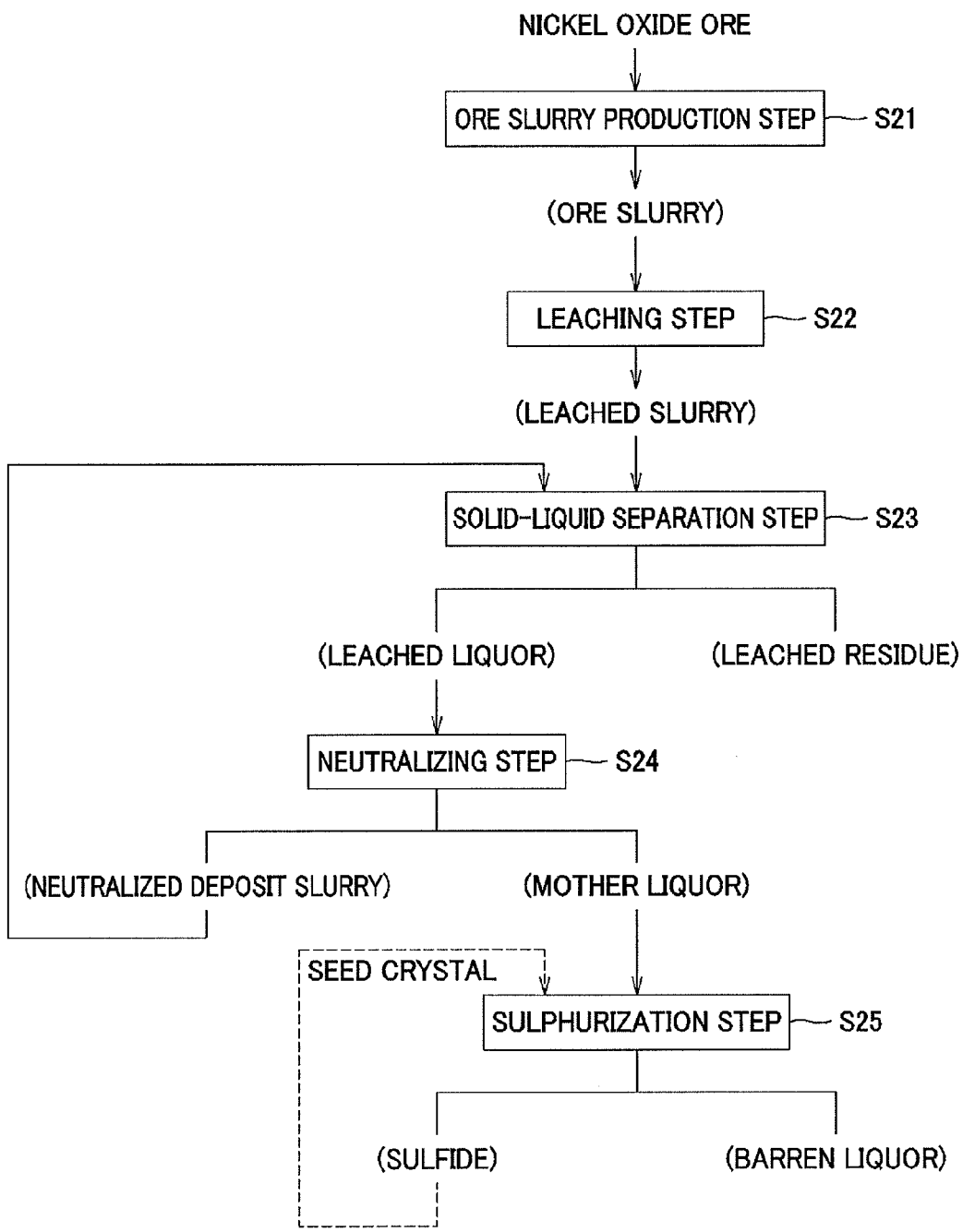
FIG. 3 is a process drawing that shows a wet refining method of a nickel oxide ore.

FIG. 3 shows one example of a process diagram of a wet refining method for nickel oxide ores by the use of a high-temperature pressure acid leaching method. As shown in FIG. 3, the wet refining method for nickel oxide ores includes an ore slurry producing step S21 for pulverizing and classifying nickel oxide ores as well as for condensing ore components to produce an ore slurry, a leaching step S22 for leaching nickel and cobalt from the resultant ore slurry, a solid-liquid separation step S23 for solid-liquid separating the resultant leached slurry into a leached liquor and leached residues, a neutralizing step S24 for neutralizing the leached liquor to be separated into a mother liquor for use in recovering nickel and a neutralized deposit slurry, and a sulfidizing step S25 for blowing a hydrogen sulfide gas into a sulfuric acid serving as a mother liquor to carry out a sulfidizing reaction so that a sulfide containing nickel and a barren liquor. The following description will discuss the respective steps in more detail.

(Ore Slurry Producing Step)

In the ore slurry producing step S21, first, nickel oxide ores serving as raw material ores are pulverized and classified based upon a predetermined classifying point so that a coarse ore slurry composed of the resultant classified and undersized ore particles is produced. Then, by carrying out a solid-liquid separation process on the resultant coarse ore slurry, moisture is removed therefrom to condense the ore components so that an ore slurry is produced.

More specifically, the ore slurry producing step S21 in the metal refining method in accordance with the present embodiment includes a pulverizing/classifying step in which raw material ores are pulverized and classified at a predetermined classifying point so as to remove oversized ore particles and obtain a coarse ore slurry composed of the undersized ore particles, a grain size measuring step in which the grain size of the coarse ore slurry obtained in the pulverizing/classifying step is measured, and an ore slurry condensing step in which the coarse ore slurry is loaded into a solid-liquid separation device so that moisture contained in the coarse ore slurry is separated and removed therefrom so that the ore components are condensed.

Moreover, in the ore slurry producing step S21, in the case when the grain size of the coarse ore slurry measured in the grain size measuring step is lower than a predetermined value, one portion of the oversized ore particles removed in the pulverizing/classifying step is loaded and added into the solid-liquid separation device in the ore slurry condensing step.

In accordance with the ore slurry producing step S21, it is possible to produce an ore slurry that can suppress the rise of the slurry viscosity, and it is also possible to transport the slurry to the next leaching process efficiency by using a general-use transporting pump or the like, without causing a transporting failure or the like.

As the concentration of the ore slurry to be produced in the ore slurry producing step S21, although not particularly limited, it is preferably adjusted in a range from 15 to 45 weight %.

(Leaching Step)

In the leaching step S22, sulfur acid is added to the ore slurry obtained in the ore slurry producing step S21, and this is stirred at a temperature from 220 to 280° C. so that a leached slurry composed of a leached liquor and leached residues is formed. In the leaching step S22, for example, a high-temperature pressurizing container (autoclave) is used.

More specifically, in the leaching step S22, leaching reactions and high-temperature thermal hydrolyzing reactions represented by the following formulas (1) to (5) are carried out so that nickel, cobalt and the like are leached out as sulfates, and the leached iron sulfate is fixed as hematite. However, since the fixation of iron ions does not progress completely, the liquid portion of the leached slurry thus obtained normally contains divalent and trivalent iron ions except for nickel, cobalt and the like.

Leaching Reactions

$$MO+H_2SO_4 \Rightarrow MSO_4+H_2O \quad (1)$$

(where in the formula, M represents Ni, Co, Fe, Zn, Cu, Mg, Cr, Mn or the like)

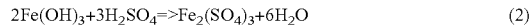

$$2Fe(OH)_3+3H_2SO_4 \Rightarrow Fe_2(SO_4)_3+6H_2O \quad (2)$$

$$FeO+H_2SO_4 \Rightarrow FeSO_4+H_2O \quad (3)$$

High-Temperature Thermal Hydrolyzing Reaction

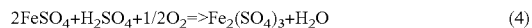

$$2FeSO_4+H_2SO_4+1/2O_2 \Rightarrow Fe_2(SO_4)_3+H_2O \quad (4)$$

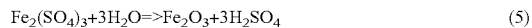

$$Fe_2(SO_4)_3+3H_2O \Rightarrow Fe_2O_3+3H_2SO_4 \quad (5)$$

Although not particularly limited, the added amount of sulfuric acid in the leaching step S22 is set to such an excessive amount as to leach iron out of the ores. For example, the amount is set in a range from 300 to 400 kg per ton. In the case when the added amount of sulfuric acid per ton of ores exceeds 400 kg, this state is not desirable because of high costs of sulfuric acid.

(Solid-Liquid Separation Step)

In the solid-liquid separation step S23, the leached slurry formed in the leaching step S22 is washed by using a multi-stage washing process so that a leached liquor containing nickel and cobalt and leached residues are obtained.

As the multi-stage washing process in the solid-liquid separation process S23, although not particularly limited, a continuous countercurrent washing method (CCD method: counter current decantation) in which the leached slurry is made in contact with a countercurrent serving as a washing solution without containing nickel is preferably used. By using this process, a washing solution to be newly introduced into the system can be reduced, and the recovery rate of nickel and cobalt can be set to 95% or more.

(Neutralizing Step)

In the neutralizing step 24, calcium carbonate is added to the leached liquor separated in the solid-liquid separation step S23, while suppressing oxidation of the leached liquor, so that the pH of the leached liquor is set to 4 or less, and a neutralized deposit slurry containing a mother solution for use in recoverying nickel and trivalent iron is formed. In the neutralizing step S14, by carrying out the neutralizing process of the leached liquor in this manner, the excessive acid used in the leaching step S22 by the use of a high-temperature pressure acid leaching treatment is neutralized, while trivalent iron ions, aluminum ions and the like remaining in the liquid are being simultaneously removed.

In the neutralizing step S24, the pH of the leached liquor to be adjusted is set to 4 or less, and more preferably, to 3.2 to 3.8. When the pH of the leached liquor exceeds 4, more nickel hydroxides are generated.

Moreover, in the neutralizing step S24, upon removing trivalent iron ions remaining in the solution, it is preferable not to oxidize iron ions that are present as divalent ions in the solution. For this reason, it is preferable to prevent oxidation of the solution caused by, for example, air blowing or the like, to the utmost extent. With this arrangement, the amount of consumption of calcium carbonate and the increase of the amount of generation of the neutralized deposit slurry, caused by removal of divalent iron ions, can be suppressed. That is, it is possible to suppress a nickel recovery loss from the deposit due to the increase of the amount of the neutralized deposit slurry.

Moreover, the neutralized deposit slurry obtained in the neutralizing step S24 can be transported to the solid-liquid separation step S23, if necessary. With this arrangement, nickel contained in the neutralized deposit slurry can be effectively recovered. More specifically, by returning the neutralized deposit slurry to the solid-liquid separation step S23 that is operated under a low PH condition, the dissolution of adhesion water of the neutralized deposit and the nickel hydroxides generated by local reactions on the surface of the neutralized deposit can be accelerated simultaneously with the washing process of the leached residues, so that the nickel components to cause a recovery loss can be reduced. Additionally, one portion of iron hydroxides is also re-dissolved simultaneously with nickel, with the result that a neutralizer is again required for fixing leached trivalent iron ions in some cases. For this reason, from these viewpoints also, it is desirable to cut the amount of the neutralized deposit without allowing divalent iron ions to be oxidized.

The reaction temperature in the neutralizing step S24 is preferably set to 50 to 80° C. In the case when the reaction temperature is less than 50° C., the neutralized deposit containing trivalent iron ions to be thus formed becomes too fine to cause bad influences to the process of the solid-liquid separation step S23 in which the neutralized deposit is circulated, if necessary. In contrast, in the case when the reaction temperature exceeds 80° C., an increase of energy costs is caused due to a reduction of anticorrosion property of the device materials and a heating process.

(Sulfidizing Step)

In the sulfidizing step S25, by blowing a hydrogen sulfide gas into a sulfuric acid solution serving as a mother liquor for use in recovering nickel obtained in the neutralizing step S24, a sulfidizing reaction is caused so that a sulfide containing nickel and a barren liquor are produced.

The mother liquor is a sulfuric acid solution that is obtained by leaching the ore slurry as described above through the neutralizing step S24. More specifically, the sulfuric acid has a pH in a range from 3.2 to 4.0, a nickel concentration in a range from 2 to 5 g/L and a cobalt concentration in a range from 0.1 to 1.0 g/L, and also contains iron, magnesium, manganese, etc., as impurity components. Although the impurity components differ greatly depending on the oxidation-reduction potential for leaching, operation conditions of the autoclave and qualities of ores, they generally contain about several grams/L of iron, magnesium and manganese. In this case, although comparatively high amounts of the impurity components are present relative to nickel and cobalt to be recovered, alkali earth metals, such as iron, manganese, alkali metals, magnesium, etc., which are low in stability as sulfides, are not contained in the sulfides to be generated.

Moreover, in the case when zinc is contained in the mother liquor, prior to the process for generating nickel or the like as sulfides by a sulfidizing reaction, a process for selectively separating zinc as a sulfide may be carried out. In the process for selectively separating zinc, by suppressing a rate of sulfidizing reaction by providing conditions that weaken the process upon carrying out a sulfidizing reaction, coprecipitation of nickel having a higher concentration than that of zinc is suppressed, and zinc is selectively removed.

In the sulfidizing step S25, sulfides containing nickel having a small impurity content and a barren liquor in which the nickel concentration is stabilized in a low standard are generated and recovered. More specifically, a slurry of sulfides obtained by a sulfidizing reaction is subjected to a precipitation-separation process by using a precipitation-separation device, such as a thickener or the like, so that sulfides that are deposits are separated and recovered from the bottom portion of the thickener, while aqueous solution components are overflowed and recovered as a barren liquor. Additionally, this barren liquor has a pH in a range from about 1 to 3, and contains impurity elements, such as iron, magnesium, manganese, etc., included therein without being sulfidized.

In the sulfidizing step S25, a sulfide (nickel sulfide) containing nickel having an average particle diameter that is adjusted so as to be larger than a predetermined size may be added to the sulfuric acid solution as a seed crystal. With this arrangement, upon carrying out the precipitation-separation process for separating the sulfide slurry generated by the sulfidizing reaction into a sulfide corresponding to the deposit and a barren liquor, it becomes possible to reduce the concentration of fine floating solid components containing nickel in the overflow liquid, thereby making it possible to increase nickel components that can be formed into a deposit as a sulfide, and consequently to reduce the recovery loss of nickel.

The added amount of the nickel sulfide forming a seed crystal is preferably set to an added amount corresponding to 4 to 6 times the nickel amount relative to the nickel amount contained in the mother liquor. With this arrangement, it is possible to suppress adhesion of generated sulfides onto the inner surface of the reaction container, and also to stabilize the nickel concentration in the barren liquor in a further lower level.

With respect to the nickel sulfide added as the seed crystal, the sulfide that has been generated in the sulfidizing step S25 and recovered through the precipitation-separation process, and then classified and particle-diameter-adjusted so as to have an average particle diameter larger than a predetermined size is preferably circulated and used. Additionally, if necessary, prior to the classifying process, a process for pulverizing the sulfide may be carried out.

<3. Examples>

The following description will discuss examples of the present invention; however, the present invention is not intended to be limited by the examples shown below.

EXAMPLES

Example 1

In an ore slurry producing step for use in recovering nickel and cobalt from nickel oxide ores serving as raw material ores, by a high-temperature pressure acid leaching method (HPAL method) by the use of sulfuric acid, first, nickel oxide ores were pulverized by using a general-use pulverizer. Then, the pulverized nickel oxide ores were classified by using a sieve with a mesh having an opening of 1.4 mm. The undersized ore particles classified by the classifying process were recovered so that a coarse ore slurry containing 100 g/L of solid components was produced. On the other hand, the classified oversized ore particles were removed and recovered in a separated manner.

Next, the grain size of the coarse ore slurry was measured by using a Microtrack Device (9320-X100, made by Nikkiso Co., Ltd.). In this case, the grain size of the coarse ore slurry was measured to obtain a volume-average diameter (mv) as a measured value. As a result, the particle diameter of the coarse ore slurry was 12.48 μm. This particle diameter was lower than a grain size condition (20 μm) that would generate a yield stress exceeding 200 Pa of the ore slurry to cause a transporting failure in a transporting pump used in a metal refining process.

Next, this coarse ore slurry was loaded into a thickener having a diameter of about 25 m, a height of about 5 m and a capacity of about 2000 m³ at a flow rate of 250 m³/hour, and subjected to a condensing process in which moisture was removed therefrom to condense the ore components. At this time, the slurry, which contained the oversized ore particles that had been removed from the pulverizing/classifying process and contained ore particles having a particle diameter of 21.71 μm, was loaded and added into the thickener at a rate of 5 weight % relative to the entire ore particles.

After completion of the condensing process, the resulting ore slurry was taken out from the lower portion of the thickener.

The yield stress of the resulting ore slurry was measured by using a rheometer (MCR301, made by Anton Paar Japan K.K.). As a result, the yield stress of the ore slurry was 170 Pa so that it was possible to transport the slurry to the next leaching step by using a general-use transporting pump, without causing any transporting failure, etc.

Moreover, in the succeeding leaching step by the use of an HPAL method also, the nickel leaching rate was 93.4%, which was a satisfactory result.

Example 2

By carrying out a pulverizing/classifying process on nickel oxide ores serving as raw material ores in the same manner as in example 1, a coarse ore slurry was obtained, and the same processes as those of example 1 were carried out so that a similar ore slurry was obtained except that when the grain size of the resulting coarse ore slurry was measured, the particle diameter of the coarse ore slurry was 14.26 μm.

The yield stress of the resulting ore slurry was measured by using a rheometer in the same manner as in example 1. As a result, the yield stress of the ore slurry was 160 Pa so that it was possible to transport the slurry to the next leaching step by using a general-use transporting pump, without causing any transporting failure, etc.

Moreover, in the succeeding leaching step by the use of the HPAL method also, the nickel leaching rate was 93.2%, which was a satisfactory result.

Example 3

By carrying out the pulverizing/classifying process on nickel oxide ores serving as raw material ores in the same manner as in example 1, a coarse ore slurry was obtained, and the same processes as those of example 1 were carried out so that a similar ore slurry was obtained except that when the grain size of the resulting coarse ore slurry was measured, the particle diameter of the coarse ore slurry was 18.26 μm.

The yield stress of the resulting ore slurry was measured by using a rheometer in the same manner as in example 1. As a result, the yield stress of the ore slurry was 150 Pa so that it was possible to transport the slurry to the next leaching step by using a general-use transporting pump, without causing any transporting failure, etc.

Moreover, in the succeeding leaching step by the use of the HPAL method also, the nickel leaching rate was 93.0%, which was a satisfactory result.

Example 4

The same processes as those of example 1 were carried out except that a slurry containing oversized ore particles was loaded and added to a thickener at a rate of 1 weight % relative to the entire ore particles together with a coarse ore slurry so that an ore slurry was produced.

The yield stress of the resulting ore slurry was measured by using a rheometer in the same manner as in example 1. As a result, the yield stress of the ore slurry was 190 Pa so that it was possible to transport the slurry to the next leaching step by using a general-use transporting pump, without causing any transporting failure, etc.

Moreover, in the succeeding leaching step by the use of the HPAL method also, the nickel leaching rate was 93.5%, which was a satisfactory result.

Example 5

The same processes as those of example 1 were carried out except that a slurry containing oversized ore particles was loaded and added to a thickener at a rate of 10 weight % relative to the entire ore particles together with a coarse ore slurry so that an ore slurry was produced.

The yield stress of the resulting ore slurry was measured by using a rheometer in the same manner as in example 1. As a result, the yield stress of the ore slurry was 140 Pa so that it was possible to transport the slurry to the next leaching step by using a general-use transporting pump, without causing any transporting failure, etc.

Moreover, in the succeeding leaching step by the use of the HPAL method also, the nickel leaching rate was 92.9%, which was a satisfactory result.

Example 6

The same processes as those of example 1 were carried out except that a slurry containing oversized ore particles was loaded and added to a thickener at a rate of 20 weight % relative to the entire ore particles together with a coarse ore slurry so that an ore slurry was produced.

The yield stress of the resulting ore slurry was measured by using a rheometer in the same manner as in example 1. As a result, the yield stress of the ore slurry was 100 Pa so that it was possible to transport the slurry to the next leaching step by using a general-use transporting pump, without causing any transporting failure, etc.

Moreover, in the succeeding leaching step by the use of the HPAL method also, the nickel leaching rate was 92.8%, which was a satisfactory result.

Example 7

The same processes as those of example 1 were carried out except that a slurry containing oversized ore particles was loaded and added to a thickener at a rate of 30 weight % relative to the entire ore particles together with a coarse ore slurry so that an ore slurry was produced.

The yield stress of the resulting ore slurry was measured by using a rheometer in the same manner as in example 1. As a result, the yield stress of the ore slurry was 90 Pa so that it was possible to transport the slurry to the next leaching step by using a general-use transporting pump, without causing any transporting failure, etc.

Moreover, in the succeeding leaching step by the use of the HPAL method also, the nickel leaching rate was 92.9%, which was a satisfactory result.

Example 8

The same processes as those of example 1 were carried out except that a slurry containing oversized ore particles was loaded and added to a thickener at a rate of 40 weight % relative to the entire ore particles together with a coarse ore slurry so that an ore slurry was produced.

The yield stress of the resulting ore slurry was measured by using a rheometer in the same manner as in example 1. As a result, the yield stress of the ore slurry was 70 Pa so that it was possible to transport the slurry to the next leaching step by using a general-use transporting pump, without causing any transporting failure, etc.

On the other hand, in the succeeding leaching step by the use of the HPAL method, the nickel leaching rate was 90.5%, which was a lower rate in comparison with the other examples.

Comparative Example 1

In comparative example 1, the same processes as those of example 1 were carried out except that only the resulting coarse ore slurry was loaded into a thickener so as to be subjected to a condensing process so that an ore slurry was obtained.

The yield stress of the resulting ore slurry was measured by using a rheometer in the same manner as in example 1. As a result, the yield stress of the ore slurry was 370 Pa, with the result that since the viscosity was too high, it was not possible to transport the slurry to the next leaching step by using a transporting pump, and the operation had to be suspended and countermeasures, such as taking out the slurry with a high viscosity adhered to the pipes and carrying out washing processes, were required.

The invention claimed is:

1. A method for producing an ore slurry from raw material ores comprising:
    a pulverizing/classifying step of pulverizing the raw material ores and classifying the resulting ores at a predetermined classifying point so that oversized ore particles are removed so as to obtain a coarse ore slurry composed of undersized ore particles;
    a grain size measuring step of measuring the grain size of the coarse ore slurry obtained by the pulverizing/classifying step; and
    an ore slurry condensing step of loading the coarse ore slurry to a solid-liquid separation device and separating and removing moisture contained in the coarse ore slurry therefrom so as to condense ore components,
    wherein in the case when the grain size measured in the grain size measuring step is lower than a predetermined value, one portion of the oversized ore particles that have been removed in the pulverizing/classifying step is loaded and added to the solid-liquid separation device in the ore slurry condensing step.

2. The method for producing an ore slurry according to claim 1, wherein the predetermined value for the grain size is set to such a value corresponding to a grain size that causes a failure in transportation of the ore slurry due to a rise in viscosity of the ore slurry thus produced.

3. The method for producing an ore slurry according to claim 2, wherein the predetermined value for the grain size corresponds to a grain size that causes a yield stress of the ore slurry to exceed 200 Pa.

4. The method for producing an ore slurry according to claim 3, wherein the predetermined value for the grain size is 20 μm.

5. The method for producing an ore slurry according to claim 1, wherein upon loading and adding the oversized ore particles to the solid-liquid separation device in the ore slurry condensing step, the oversized ore particles are adjusted so as to have a particle size in a range from 20 to 100 μm and added thereto.

6. The method for producing an ore slurry according to claim 1, wherein the oversized ore particles are added at a rate of 1 to 30 weight % relative to the entire ore particles to be loaded into the solid-liquid separation device.

7. The method for producing an ore slurry according to claim 1, wherein the raw material ores are nickel oxide ores.

8. The method for producing an ore slurry according to claim 7, wherein the ore slurry is used for a process for recovering nickel and cobalt from the ore slurry by a high-temperature pressure leaching method by the use of sulfuric acid.

9. A metal refining method for recovering a metal contained in raw material ores from the raw material ores comprising:
    a pulverizing/classifying step of pulverizing the raw material ores and classifying the resulting ores at a predetermined classifying point so that oversized ore particles are removed so as to obtain a coarse ore slurry composed of undersized ore particles;
    a grain size measuring step of measuring the grain size of the coarse ore slurry obtained by the pulverizing/classifying step; and
    an ore slurry condensing step of loading the coarse ore slurry to a solid-liquid separation device and separating and removing moisture contained in the coarse ore slurry therefrom so as to condense ore components,
    wherein in the case when the grain size measured in the grain size measuring step is lower than a predetermined value, one portion of the oversized ore particles that have been removed in the pulverizing/classifying step is loaded and added to the solid-liquid separation device in the ore slurry condensing step.

10. The metal refining method according to claim 9, wherein the raw material ores are nickel oxide ores and nickel and cobalt are recovered from the nickel oxide ores.

11. The metal refining method according to claim 10, wherein the ore slurry produced by the ore slurry producing steps is added to sulfuric acid and leached out under high temperature and high pressure so that a leached liquor containing nickel and cobalt is obtained.

* * * * *